(12) United States Patent
Yamada

(10) Patent No.: US 8,300,190 B2
(45) Date of Patent: Oct. 30, 2012

(54) LIQUID CRYSTAL PANEL, LIQUID CRYSTAL DISPLAY UNIT, AND TELEVISION RECEIVER EQUIPPED WITH THE SAME

(75) Inventor: Naoshi Yamada, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 630 days.

(21) Appl. No.: 12/595,745

(22) PCT Filed: Apr. 3, 2008

(86) PCT No.: PCT/JP2008/056674
§ 371 (c)(1),
(2), (4) Date: Oct. 13, 2009

(87) PCT Pub. No.: WO2009/022481
PCT Pub. Date: Feb. 19, 2009

(65) Prior Publication Data
US 2010/0110306 A1    May 6, 2010

(30) Foreign Application Priority Data
Aug. 10, 2007  (JP) ................. 2007-210341

(51) Int. Cl.
*G02F 1/1337* (2006.01)
(52) U.S. Cl. ........................ 349/129; 349/130
(58) Field of Classification Search .......... 349/129, 349/130
See application file for complete search history.

(56) References Cited

U.S. PATENT DOCUMENTS

| | | | |
|---|---|---|---|
| 6,661,488 B1 | 12/2003 | Takeda et al. | |
| 6,724,452 B1 | 4/2004 | Takeda et al. | |
| 6,879,364 B1 | 4/2005 | Sasaki et al. | |
| 7,167,224 B1 | 1/2007 | Takeda et al. | |
| 7,224,421 B1 | 5/2007 | Takeda et al. | |
| 7,304,703 B1 | 12/2007 | Takeda et al. | |
| 7,405,789 B1 | 7/2008 | Sasaki et al. | |
| 2002/0159018 A1 | 10/2002 | Kataoka et al. | |
| 2003/0011731 A1 | 1/2003 | Yoshida et al. | |
| 2004/0095536 A1 | 5/2004 | Yoshida et al. | |
| 2004/0119924 A1 | 6/2004 | Takeda et al. | |
| 2005/0099582 A1 | 5/2005 | Doi et al. | |
| 2005/0128397 A1 | 6/2005 | Sasaki et al. | |

(Continued)

OTHER PUBLICATIONS

International Search Report for PCT/JP2008/056674, mailed Jun. 10, 2008.

*Primary Examiner* — Richard Kim
*Assistant Examiner* — David Chung
(74) *Attorney, Agent, or Firm* — Nixon & Vanderhye, P.C.

(57) ABSTRACT

Projecting sections controlling alignment directions of liquid crystal molecules are provided on at least one of an active matrix substrate and a counter substrate. When viewed from a direction perpendicular to a surface of the active matrix substrate or of the counter substrate, an outline shape of the projecting sections is constituted by continuously arranging a plurality of unit patterns each having a side in parallel with the polarization axis of the first polarizing plate and a side in parallel with the polarization axis of the second polarizing plate. This makes it possible to provide a liquid crystal panel that performs better display with high contrast by reducing a light leakage during a black display period and by ensuring a light transmittance during a gray level display period and a white display period.

11 Claims, 12 Drawing Sheets

U.S. PATENT DOCUMENTS

| | | |
|---|---|---|
| 2006/0066795 A1 | 3/2006 | Hsu et al. |
| 2006/0176430 A1 | 8/2006 | Sasaki et al. |
| 2007/0030421 A1 | 2/2007 | Sasaki et al. |
| 2007/0064187 A1 | 3/2007 | Takeda et al. |
| 2007/0132929 A1 | 6/2007 | Kataoka et al. |
| 2008/0055528 A1 | 3/2008 | Sasaki et al. |
| 2008/0165314 A1 | 7/2008 | Takeda et al. |
| 2008/0303997 A1 | 12/2008 | Takeda et al. |
| 2009/0141226 A1 | 6/2009 | Kataoka et al. |
| 2011/0032466 A1* | 2/2011 | Hakoi et al. .................. 349/129 |

* cited by examiner (a)

(b)

(a)

(b)

(a)

(b)

(a)

(b)

(c)

LIQUID CRYSTAL PANEL, LIQUID CRYSTAL DISPLAY UNIT, AND TELEVISION RECEIVER EQUIPPED WITH THE SAME

This application is the U.S. national phase of International Application No. PCT/JP2008/056674 filed 3 Apr. 2008, which designated the U.S. and claims priority to JP Application No. 2007-210341 filed 10 Aug. 2007, the entire contents of each of which are hereby incorporated by reference.

TECHNICAL FIELD

The present invention relates to (i) a liquid crystal panel that displays images by voltage application to liquid crystal and (ii) a television receiver including the liquid crystal panel.

BACKGROUND ART

Liquid crystal display units (liquid crystal display devices) are plane display devices having excellent features such as high resolution, thin thickness, light weight, and low-power-consumption. Because of recent improvements in display performance and a production capacity, and of an increased price competitiveness against other display devices, a market of the liquid crystal display devices has been rapidly expanded. Under these circumstances, there has been proposed a liquid crystal display device of a VA (vertical alignment) mode for improving contrast ratio and a viewing angle characteristic.

According to the liquid crystal display of the VA mode, liquid crystal molecules filling a gap between substrates are oriented substantially perpendicular to surfaces of the substrates while no voltage is applied. In this state, a polarization plane of light entered the liquid crystal display device is scarcely twisted in a liquid crystal layer. On the other hand, while the voltage is applied, the liquid crystal molecules are oriented at a certain angle with respect to a direction perpendicular to the surfaces of the substrates. The angle at which the liquid crystals are oriented depends on intensity of the voltage applied. In this state, the polarization plane of the light entered the liquid crystal display device is twisted in the liquid crystal layer. That is, by arranging two polarizing plates, one of which is provided on a light-entering side and the other one of which is provided on a light-emitting side, in such a manner that polarization axes of the two polarizing plates are in a crossed Nicols state, it is possible to achieve a normally black display in which a black display is performed while no voltage is applied whereas a white display is performed while the voltage is applied.

Such a VA mode achieves better contrast and viewing angle characteristic as compared to, for example, a TN mode. However, in a case where a gray level is displayed, the VA mode still has a problem that a display condition depends on a viewing angle. In order to overcome this problem, for example, Patent Literature 1 discloses a liquid crystal display device of an MVA (Multi domain Vertical Alignment) mode, in which a plurality of regions are provided within a pixel and the liquid crystal molecules provided in each of the plurality of regions are aligned at a different angle from each other.

Such a liquid crystal display device is arranged so that the liquid crystal display of the VA mode, in which a conventional vertical alignment film is employed and negative liquid crystal is enclosed as a liquid crystal material, further includes domain controlling means for achieving a state where the liquid crystal molecules within one pixel are oriented at a plurality of angles when the liquid crystal molecules are tilted.

(a) to (c) of FIG. 12 are cross-sectional views illustrating an example of a liquid crystal display device, in which the domain controlling means is provided. The example shown in FIG. 12 is arranged such that a liquid crystal layer is held by two substrates facing each other, and includes: an electrode 52 provided on an upper substrate; an electrode 53 provided on a lower substrate; projections 60 provided on inner surfaces of the electrode 52 and the electrode 53; and vertical alignment films 62 provided so as to cover the projections 60, the electrode 52, and the electrode 53.

As illustrated in (a) of FIG. 12, while no voltage is applied, the liquid crystal molecules are aligned perpendicular to surfaces of the two substrates due to an effect of the vertical alignment films 62. Since the liquid crystal molecules in the vicinity of the projections 60 are also to be aligned perpendicular to slanted surfaces of the projections 60, the liquid crystal molecules in the vicinity of the projections 60 are aligned obliquely to the surfaces of the two substrates. Nevertheless, almost all the liquid crystal molecules other than those in the vicinity of the projections are aligned perpendicular to the surfaces of the two substrates while no voltage is applied. As such, the black display is performed.

In contrast, while the voltage is applied, potential is distributed within the liquid crystal layer as illustrated in (b) of FIG. 12. That is, the potential in regions in which no projection 60 is provided is distributed in parallel with the two substrates (electrical field is in perpendicular to the two substrate), whereas the potential in the vicinity of the projections 60 is distributed obliquely to the two substrates.

The liquid crystal molecules are oriented depending on intensity of the electrical field while the voltage is applied. However, since the electrical field is perpendicular to the two substrates, the liquid crystal molecules can be oriented along any direction in 360 degrees with respect to the electrical field unless an orientation direction is set by rubbing.

Here, if some of the liquid crystal molecules are obliquely aligned in advance due to an effect of the projections 60 (see (a) of FIG. 12), the liquid crystal molecules in the vicinity of the some of the liquid crystal molecules are also aligned obliquely in a same direction as the some of the liquid crystal molecules. This is a characteristic that the liquid crystal molecules have. Further, the electrical field is distributed obliquely according to the slanted surfaces of the projections 60 in the vicinity of the projections 60 (see (b) of FIG. 12). Although negative liquid crystal molecules are oriented in a direction perpendicular to the electrical field when the voltage is applied, the direction is equal to a direction in which the negative liquid crystal molecules are originally aligned due to the effect of the projections 60. That is, the negative liquid crystal molecules are to be oriented in the direction more stably.

Accordingly, with the projections 60 provided as shown in (c) of FIG. 12, it is possible to achieve a state where the liquid crystal molecules are stably oriented in an intended direction in each region defined by the corresponding projection 60. This is due to an alignment effect attributed to the slanted surfaces of the projections 60 and obliquely distributed electrical field in the vicinity of the projections 60. When the voltage of a higher intensity is applied, the liquid crystal molecules are oriented in substantially parallel to the two substrates. With such an arrangement, it possible to control an orientation direction of the liquid crystal molecules in each region separated by the domain controlling means while the voltage is applied. As such, it is possible to achieve a better viewing angle characteristic while the gray level is displayed.

CITATION LIST

Patent Literature 1
Japanese Patent Application Publication, Tokukaihei, No. 11-242225 A (Publication Date: Sep. 7, 1999)
Patent Literature 2
Japanese Patent Application Publication, Tokukai, No. 2002-107730 A (Publication Date: Apr. 10, 2002)
Patent Literature 3
Japanese Patent Application Publication, Tokukai, No. 2000-155317 A (Publication Date: Jun. 6, 2000)

SUMMARY OF INVENTION

Note however in the arrangement that the liquid crystal molecules in the vicinity of the projections 60 are obliquely aligned even while no voltage is applied. Since the liquid crystal molecules thus obliquely aligned have a birefringence characteristic, a light leakage occurs in the vicinity of the projections 60, thereby causing a problem of reduction in contrast. The problem is described in more details below.

FIG. 13 illustrates a relation between a projection 60 and a polarization axis of two polarizing plates respectively disposed on a light-entering side and on a light-emitting side. In a case of a liquid crystal display device of an MVA mode, the projections 60 are disposed so that a centerline thereof is at 45 degrees with respect to the polarization axis (see FIG. 13). The projections 60 are thus arranged because a highest optical transmittance is achieved due to a birefringence effect of liquid crystal in a case where the liquid crystal molecules are oriented at 45 degrees with respect to the polarization axis while the voltage is applied.

On the other hand, while no voltage is applied, the liquid crystal molecules in the vicinity of the projections 60 are obliquely aligned at 45 degrees with respect to the polarization axis. In other words, light is transmitted in the vicinity of the projections 60 (regions A shown in FIG. 13) even while no voltage is applied; that is, a light leakage occurs in the vicinity of the projections 60. Accordingly, brightness of a black display while no voltage is applied increases, thereby causing a decrease in the contrast.

The alignment direction of the liquid crystal molecules can be controlled also by providing openings (slits) on pixel electrodes or on a common electrode. The slits give the following effects. First, it is possible to align the liquid crystal molecules obliquely according to a form of the slits during a black display period, thereby achieving the same effect as the case where the projections 60 are provided. Further, by applying a low voltage during the black display period so as to increase a response speed of the liquid crystal, the liquid crystal molecules in the vicinity of the slits are kept slightly oriented. This also makes it possible to control the alignment direction of the liquid crystal molecules.

The arrangement in which the slits are provided is also associated with the problem of decrease in the contrast due to the light leakage while no voltage is applied, in the same manner as the case where the projections 60 are provided.

The present invention has been made in view of the problems, and an object thereof is to achieve (i) a liquid crystal panel that performs better display with high contrast by reducing a light leakage during a black display period and by ensuring a light transmittance during a gray level display period and a white display period, and (ii) a television receiver including the liquid crystal panel.

In order to attain the object, a liquid crystal panel according to the present invention is a liquid crystal panel performing display in a vertical alignment mode, and including: an active matrix substrate on which pixel electrodes, scanning signal lines, and data signal lines are provided; a counter substrate that faces the active matrix substrate; a liquid crystal layer provided between the active matrix substrate and the counter substrate; a first polarizing plate; and a second polarizing plate, the first polarizing plate having a polarization axis perpendicular to a polarization axis of the second polarizing plate, the liquid crystal panel further including: alignment control structures on at least one of the active matrix substrate and the counter substrate, the alignment control structures controlling alignment directions of liquid crystal molecules, the alignment control structures respectively having an outline shape in a region in which one or more of the pixel electrodes are located when viewed from a direction perpendicular to a surface of the active matrix substrate or of the counter substrate, the outline shape being constituted by continuously arranging a plurality of unit patterns each having a side in parallel with the polarization axis of the first polarizing plate and a side in parallel with the polarization axis of the second polarizing plate.

With this arrangement, the outline shape of each of the alignment control structures is in parallel with the polarization axis of the first polarizing plate or with the polarization axis of the second polarizing plate. Accordingly, the liquid crystal molecules in the vicinity of the alignment control structures are also aligned in parallel with the polarization axis of the first polarizing plate or with the polarization axis of the second polarization plate while no voltage is applied to the liquid crystal layer.

Here, the liquid crystal molecules in the vicinity of the alignment control structures are obliquely aligned; however, in a direction that is parallel with the polarization axis. That is, the light passes through the liquid crystal layer without rotation of a polarizing direction thereof. As such, the light leakage is prevented.

On the other hand, while the voltage is applied to the liquid crystal layer, the liquid crystal molecules in the vicinity of the alignment control structures are oriented in such a manner that a region in which the liquid crystal molecules are oriented in parallel with the polarization axis of the first polarizing plate and a region in which the liquid crystal molecules are oriented in parallel with the polarization axis of the second polarizing plate are repeatedly and alternately provided. Averaged effects of these regions cause the liquid crystal molecules other than those in the vicinity of the alignment control structures to be oriented at a predetermined angle with respect to the polarization axis while the voltage is applied.

In addition, electrical field to be generated in the liquid crystal layer is also obliquely distributed due to the effect of the alignment control structures. The electrical field is generated also in such a manner that a region in which the electrical field is in parallel with the polarization axis of the first polarizing plate and a region in which the electrical field is in parallel with the polarization axis of the second polarizing plate are repeatedly and alternately arranged. Therefore, averaged effects of these regions also cause the liquid crystal molecules other than those in the vicinity of the alignment control structures to be oriented at a predetermined angle with respect to the polarization axis while the voltage is applied.

With the alignment control structures as described above, it is possible to achieve a state where the liquid crystal molecules are stably oriented in an intended direction in each alignment region defined by the corresponding alignment control structure, due to the alignment effect of the slanted surfaces of the alignment control structures and to the effect of the obliquely distributed electrical field in the vicinity of the alignment control structures.

Since this state makes it possible to reduce the light leakage during the black display period and to ensure the light transmittance during the gray level display period and during the white display period, it is possible to provide a liquid crystal panel that performs better display with high contrast.

Further, the liquid crystal panel according to the present invention may be arranged, in addition to the above-described arrangement, such that each of the alignment control structures is shaped so that a centerline thereof is a line at a predetermined angle with respect to the polarization axis of the first polarizing plate or with respect to the polarization axis of the second polarizing plate, and the plurality of unit patterns are continuously provided on both sides of the centerline.

With the arrangement, it is possible to set, on both sides of the centerline of each of the alignment control structures, regions in which the alignment direction of the liquid crystal molecules are controlled. Further, since the centerline of the alignment control structures is at a predetermined angle with respect to the polarization axis of the first polarizing plate or with respect to the polarization axis of the second polarizing plate, it is possible to orient the liquid crystal molecules so as to ensure the light transmittance while the voltage is applied to the liquid crystal layer. As such, it is possible to further improve the contrast.

Further, the liquid crystal panel according to the present invention may be arranged, in addition to the above-described arrangement, such that the centerline of each of the alignment control structures is at an angle of 45 degrees with respect to the polarization axis of the first polarizing plate or with respect to the polarization axis of the second polarizing plate.

With the arrangement, since the centerline of each of the alignment control structures is at an angle of 45 degrees with respect to the polarization axis of the first polarizing plate or with respect to the polarization axis of the second polarizing plate, it is possible to orient the liquid crystal molecules so as to achieve the most efficient light transmittance while the voltage is applied to the liquid crystal layer. As such, it is possible to further improve the contrast.

Further, the liquid crystal panel according to the present invention may be arranged, in addition to the above-described arrangement, such that each of the plurality of unit patterns has a shape such that a length of the side in parallel with the polarization axis of the first polarizing plate is equal to a length of the side in parallel with the polarization axis of the second polarizing plate.

According to the arrangement, the length of the side in parallel with the polarization axis of the first polarizing plate is equal to the length of the side in parallel with the polarization axis of the second polarizing plate. Therefore, averaged effects of these sides cause the liquid crystal molecules other than those in the vicinity of the alignment control structures to be oriented at substantially 45 degrees with respect to the polarization axis while the voltage is applied. Accordingly, it is possible to orient the liquid crystal molecules so as to achieve the most efficient light transmittance while the voltage is applied. As such, it is possible to further improve the contrast.

Further, the liquid crystal panel according to the present invention may be arranged, in addition to the above-described arrangement, such that each of the plurality of unit patterns is in a shape of a mountain whose vertex angle is 90 degrees.

With the arrangement, it is possible to achieve a state where one side of the mountain part is in parallel with the polarization axis of the first polarizing plate and the other side of the mountain part is in parallel with the polarization axis of the second polarizing plate. Accordingly, it is possible to achieve a relatively simple outline shape of the alignment control structures.

Further, the liquid crystal panel according to the present invention may be arranged, in the above-described arrangement, such that each of the plurality of unit patterns is in a shape of a mountain whose vertex angle is 90 degrees, and a mountain shape obtained by continuously arranging the plurality of unit patterns has a chipped vertex angle(s) or a rounded vertex angle(s) in at least one of mountain portion(s) and a valley portion(s) of the plurality of unit patterns.

With the arrangement, it is possible to achieve a state where one side of the mountain part is in parallel with the polarization axis of the first polarizing plate and the other side of the mountain part is in parallel with the polarization axis of the second polarizing plate. Further, since the mountain part has the chipped vertex angle(s) or the rounded vertex angle(s) in at least one of the mountain portion(s) and the valley portion(s), it is possible to achieve the alignment control structures each having an outline shape that can be more easily produced.

Further, the liquid crystal panel according to the present invention may be arranged, in the above-described arrangement, such that the alignment control structures are projecting sections projecting inwardly to the liquid crystal layer from at least one of the active matrix substrate and the counter substrate.

The liquid crystal molecules are to be aligned perpendicular to the surface of the substrate while no voltage is applied. Therefore, in the arrangement, the liquid crystal molecules in the vicinity of the projecting sections are to be aligned perpendicular to the slanted surfaces of the projecting sections; that is, the liquid crystal molecules in the vicinity of the projecting sections are aligned obliquely to the surface of the substrate. Further, the liquid crystal molecules have such a characteristic that if some of the liquid crystal molecules are obliquely aligned in advance due to an effect of the projecting sections, the liquid crystal molecules in the vicinity of the some of the liquid crystal molecules are also aligned obliquely in the same direction while the voltage is applied. Furthermore, the electrical field in the vicinity of the projecting sections is aligned according to the slanted surfaces of the projecting sections. The liquid crystal molecules are oriented in a direction perpendicular to the electrical field while the voltage is applied. Here, the direction in which the liquid crystal molecules are oriented is equal to a direction in which the liquid crystal molecules were originally aligned due to the effect of the projecting sections. That is, the liquid crystal molecules are oriented to this direction more stably. Therefore, with the projecting sections, it is possible to achieve a state where the liquid crystal molecules are stably oriented in an intended direction in each region defined by the corresponding projecting section, due to the alignment effect of the slanted surfaces of the projecting sections and to the effect of the oblique electrical field in the vicinity of the projecting sections.

Further, the liquid crystal panel according to the present invention may be arranged, in the above-described arrangement, such that the alignment control structures are at least one of (i) slits made of open regions of the pixel electrodes provided on the active matrix substrate and (ii) slits made of open regions of a counter electrode provided on the counter substrate.

The liquid crystal molecules are to be aligned perpendicular to the surface of the substrate while no voltage is applied. Therefore, in the arrangement, the liquid crystal molecules in the vicinity of the slits are to be aligned perpendicular to slanted surfaces of the slits; that is, the liquid crystal molecules in the vicinity of the slits are aligned obliquely to the surface of the substrate. Further, the liquid crystal molecules have such a characteristic that if some of the liquid crystal molecules are obliquely aligned in advance due to effect of the slits, the liquid crystal molecules in the vicinity of the some of the liquid crystal molecules are also oriented obliquely in the same direction while the voltage is applied. Furthermore, the electrical field in the vicinity of the slits is obliquely distributed according to the inclined surfaces of the slits. The liquid crystal molecules are oriented in a direction perpendicular to the electrical field while the voltage is applied. Here, the direction in which the liquid crystal molecules are oriented is equal to a direction in which the liquid crystal molecules were originally aligned due to the effect of the slits. That is, the liquid crystal molecules are oriented to this direction more stably. Therefore, with the slits, it is possible to achieve a state where the liquid crystal molecules are stably oriented in an intended direction in each region defined by the corresponding slit, due to the alignment effect of the slanted surfaces of the slits and to the effect of the obliquely oriented electrical field in the vicinity of the slits.

Further, it is possible to arrange a liquid crystal display device by including the liquid crystal panel according the present invention and a liquid crystal panel driving section.

Further, a predetermined voltage may be slightly applied to each pixel even during a black display period. For example, if the predetermined voltage near threshold voltage is applied, then the liquid crystal molecules are slightly oriented even during the black display period, so that response speed at which gray scale is changed from black to white is improved. Even if the voltage applied is close to or lower than the threshold voltage, a transmittance gradually increases as the voltage applied increases. Thus, if the voltage is applied even during the black display period, then it is possible to prevent the decrease in contrast due to the light leakage in the vicinity of an alignment control structures such as the projections and the slits, in comparison with the case where no voltage is applied.

Further, it is possible to arrange a television receiver including the liquid crystal display device and a tuner section for receiving television broadcasting.

Figure 1:
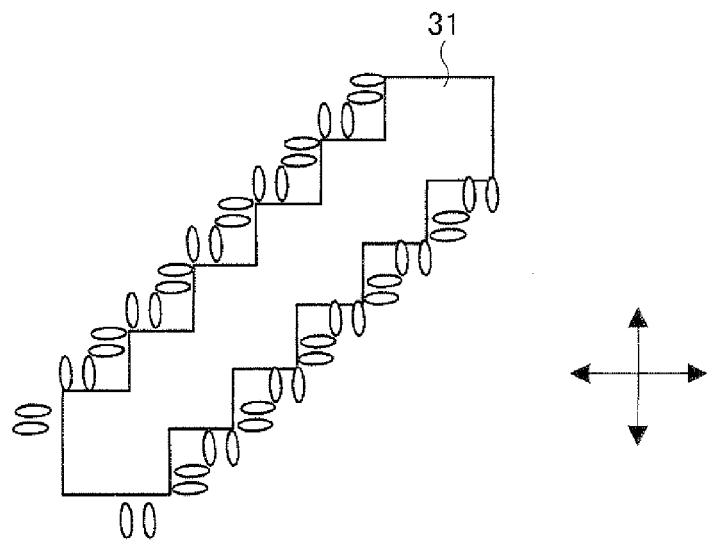
FIG. 1
Figure 1:
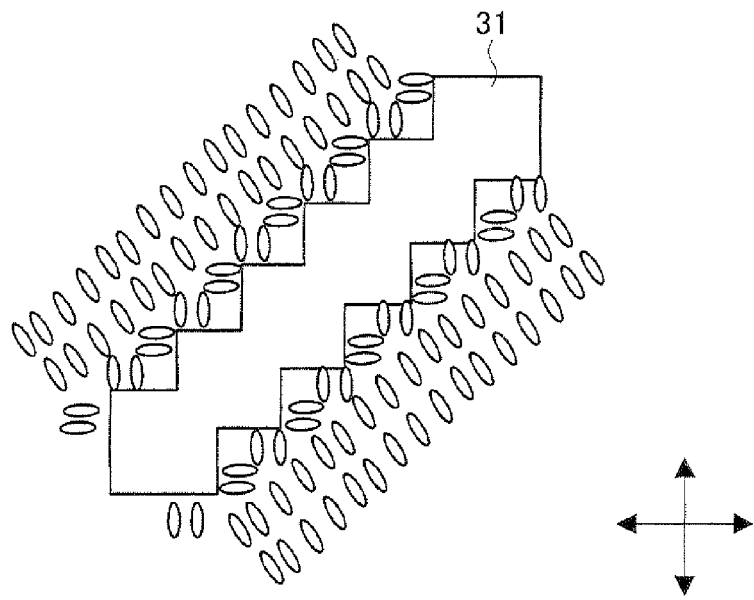

(a) and (b) of FIG. 1 show a view illustrating an outline shape of a projecting section or of a slit viewed from a direction perpendicular to surfaces of an active matrix substrate and of a counter substrate. (a) is in a black display period, and (b) is in a gray level display period.

FIG. 2

Figure 2:
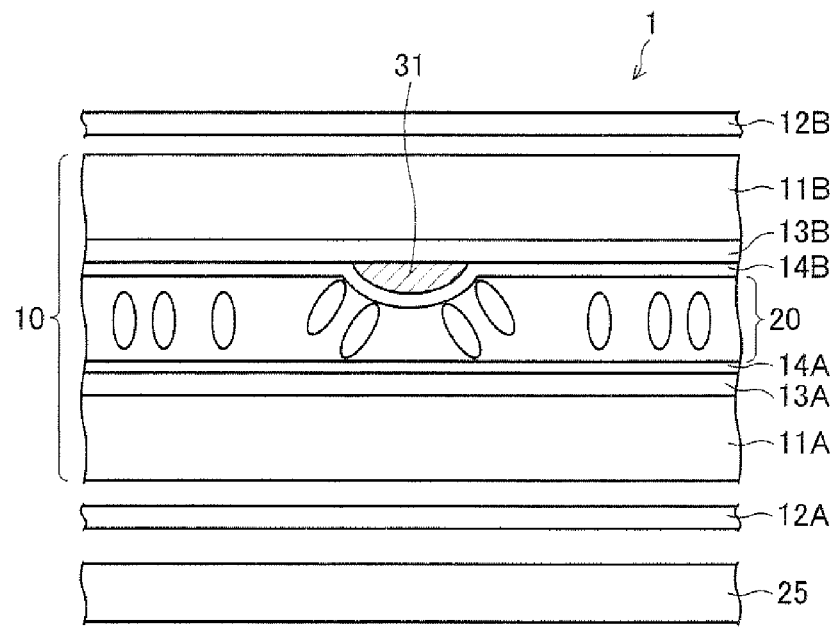
Figure 2:
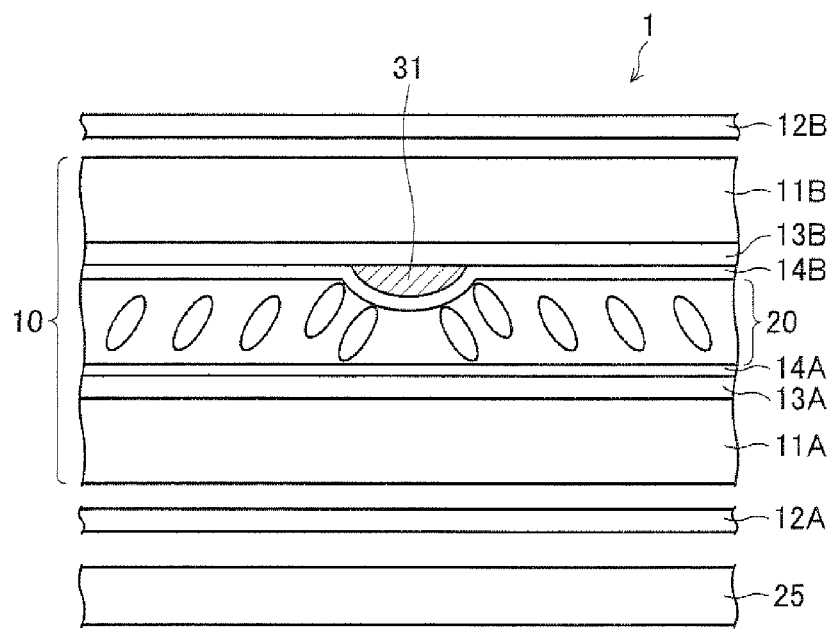

(a) and (b) of FIG. 2 are cross-sectional views illustrating a schematic structure of a liquid crystal display device according to the present embodiment wherein the projecting sections are provided. (a) is in the black display period, and (b) is in the gray level display period.

FIG. 3

Figure 3:
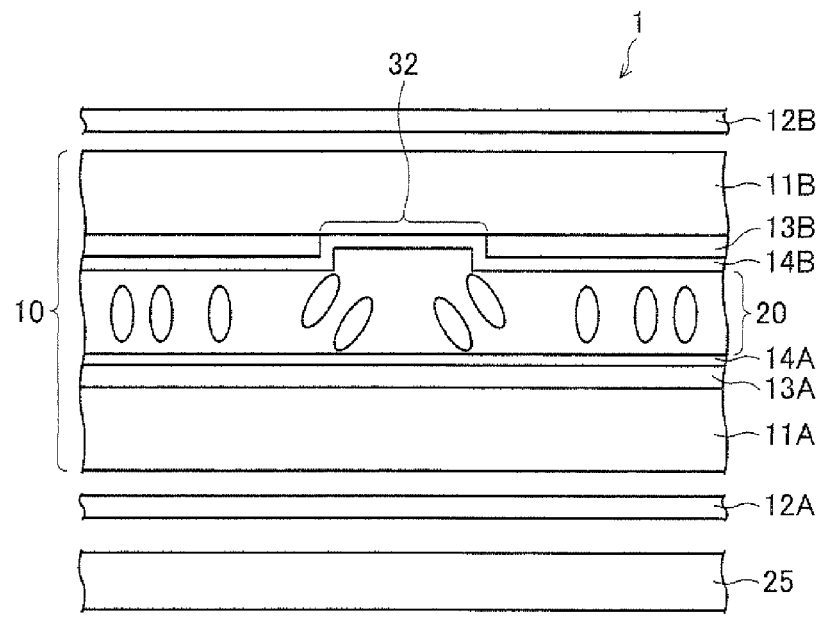
Figure 3:
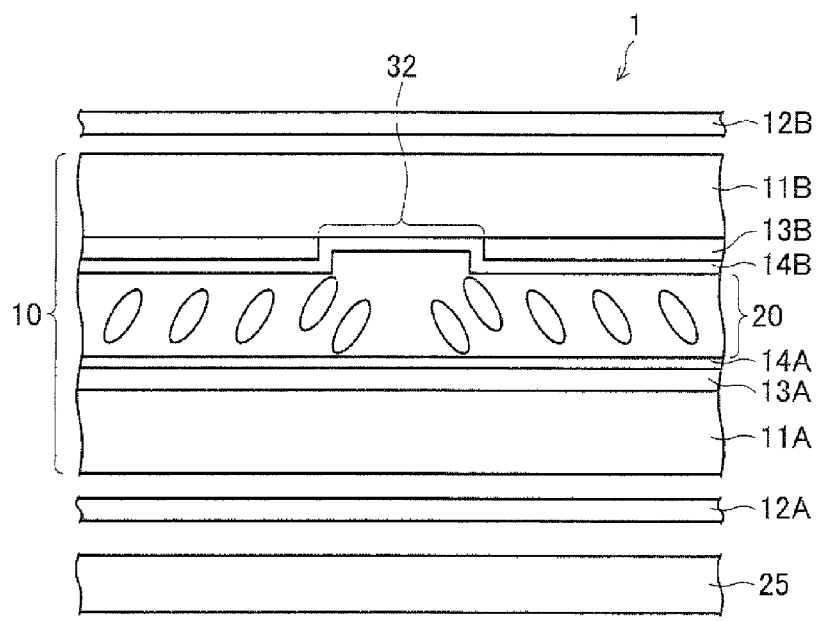

(a) and (b) of FIG. 3 are cross-sectional views illustrating a schematic structure of a liquid crystal display device according to the present embodiment wherein the slits are provided. (a) is in the black display period, and (b) is in the gray level display period.

FIG. 4

Figure 4:
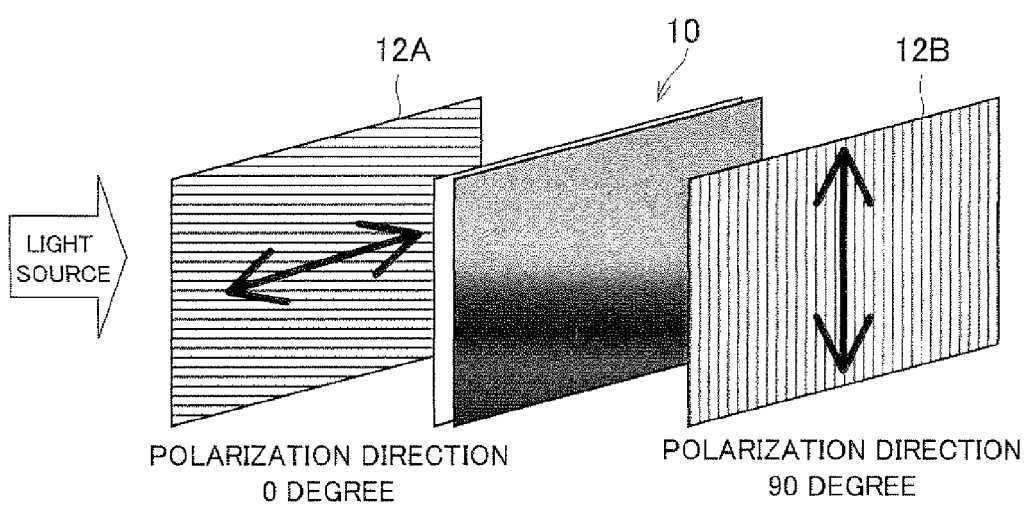

FIG. 4 is an exploded perspective view illustrating how a first polarizing plate, a second polarizing plate, and a liquid crystal panel section are arranged.

FIG. 5

Figure 5:
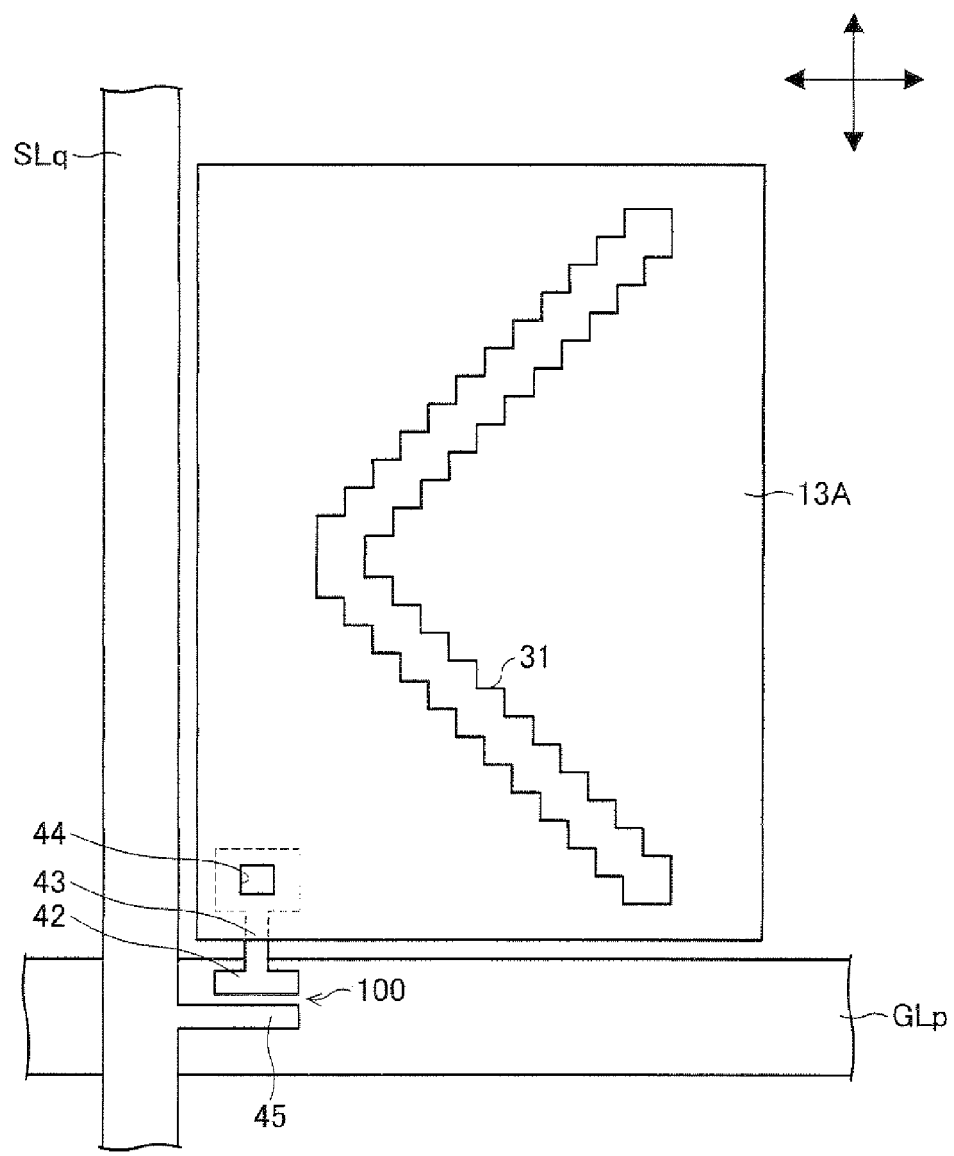

FIG. 5 is a see-through plan view illustrating a positional relationship between (i) a pixel electrode and a structure therearound in the active matrix substrate and (ii) the projecting section provided on the counter substrate.

FIG. 6

Figure 6:
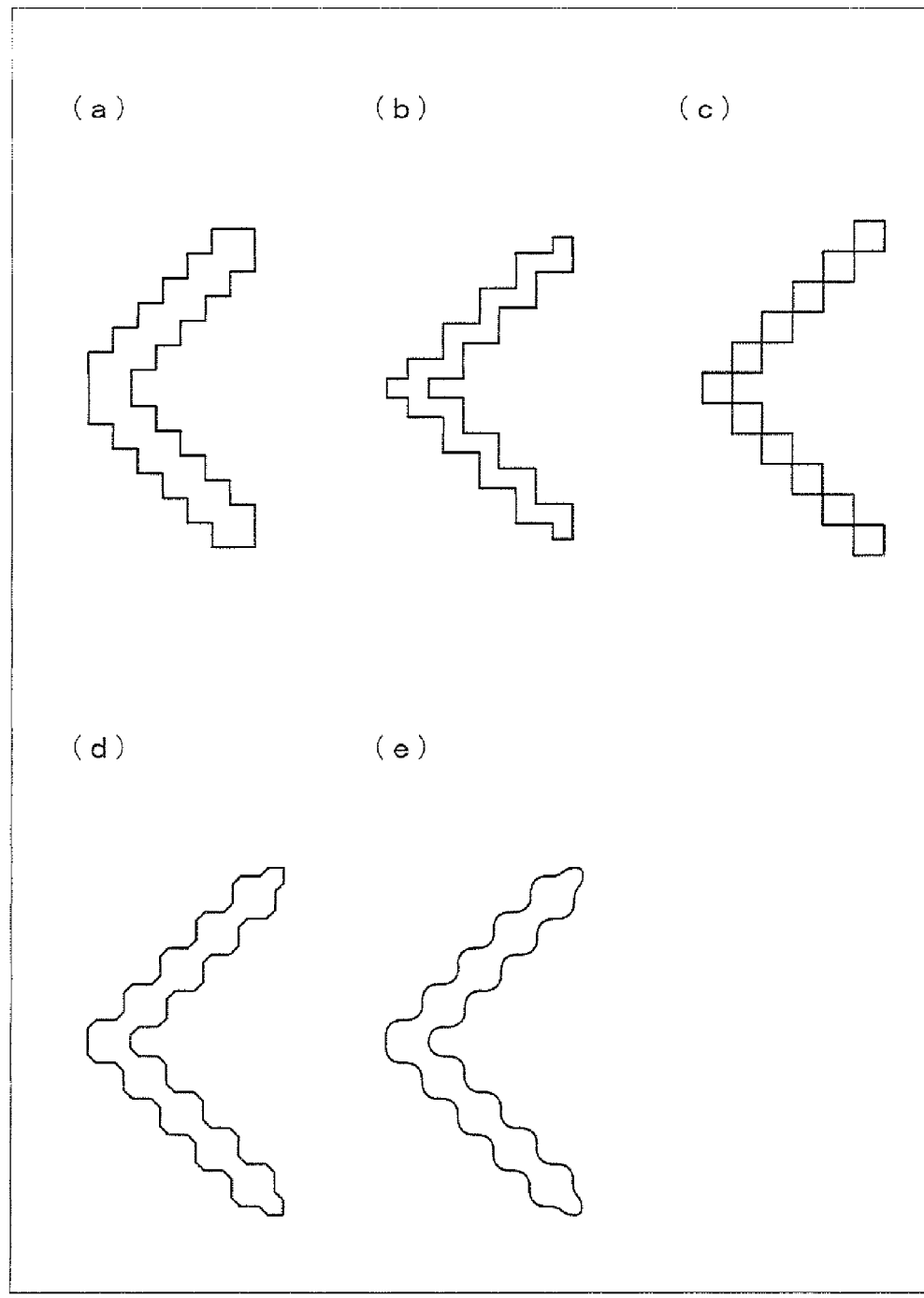

(a) to (e) of FIG. 6 illustrate variations of the outline shape of the projecting section and of the slit.

FIG. 7

Figure 7:
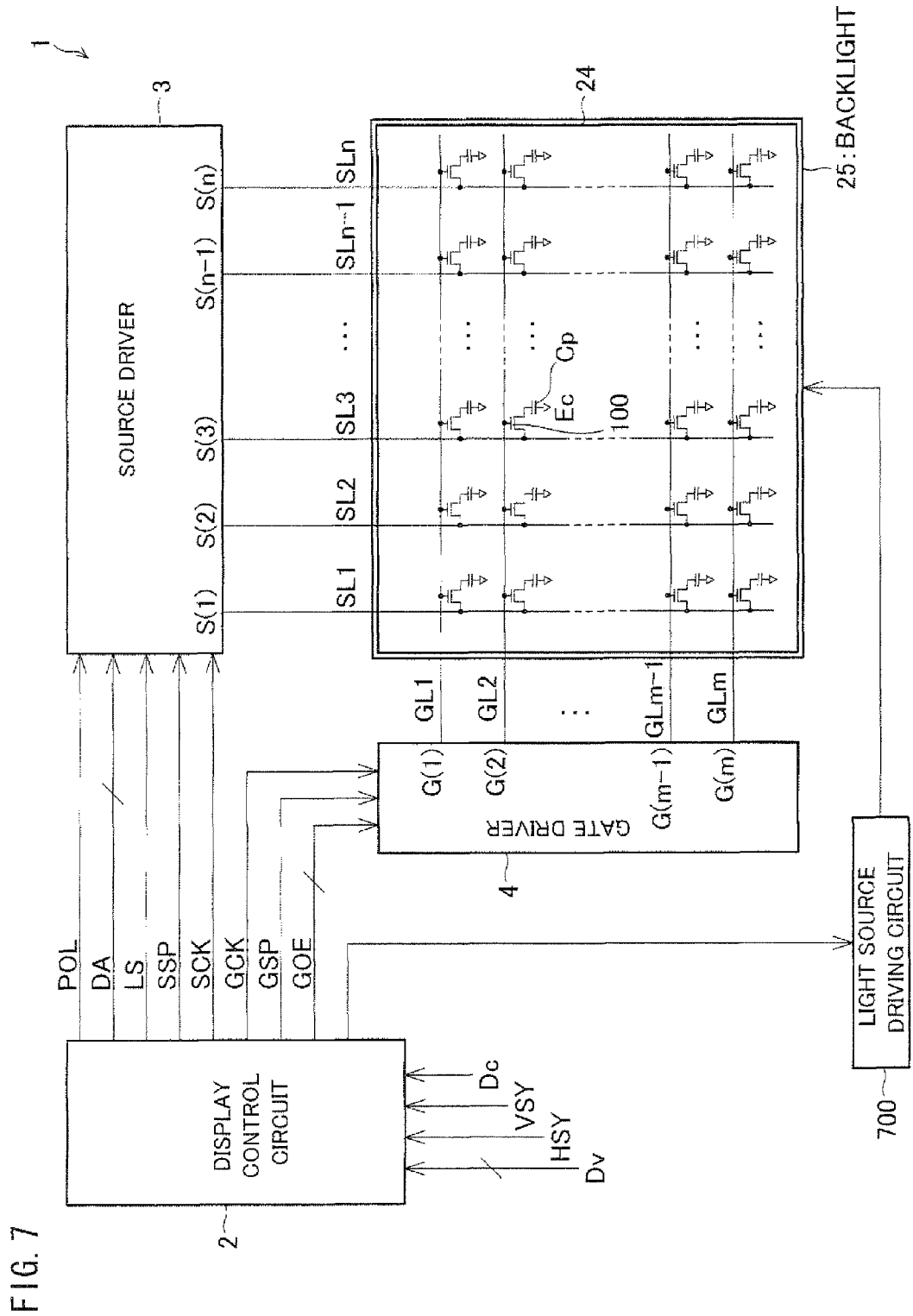

FIG. 7 is a block diagram illustrating (i) an arrangement of a liquid crystal display device according to an embodiment of the present invention and (ii) an equivalent circuit of a display section of the liquid crystal display device.

FIG. 8

Figure 8:
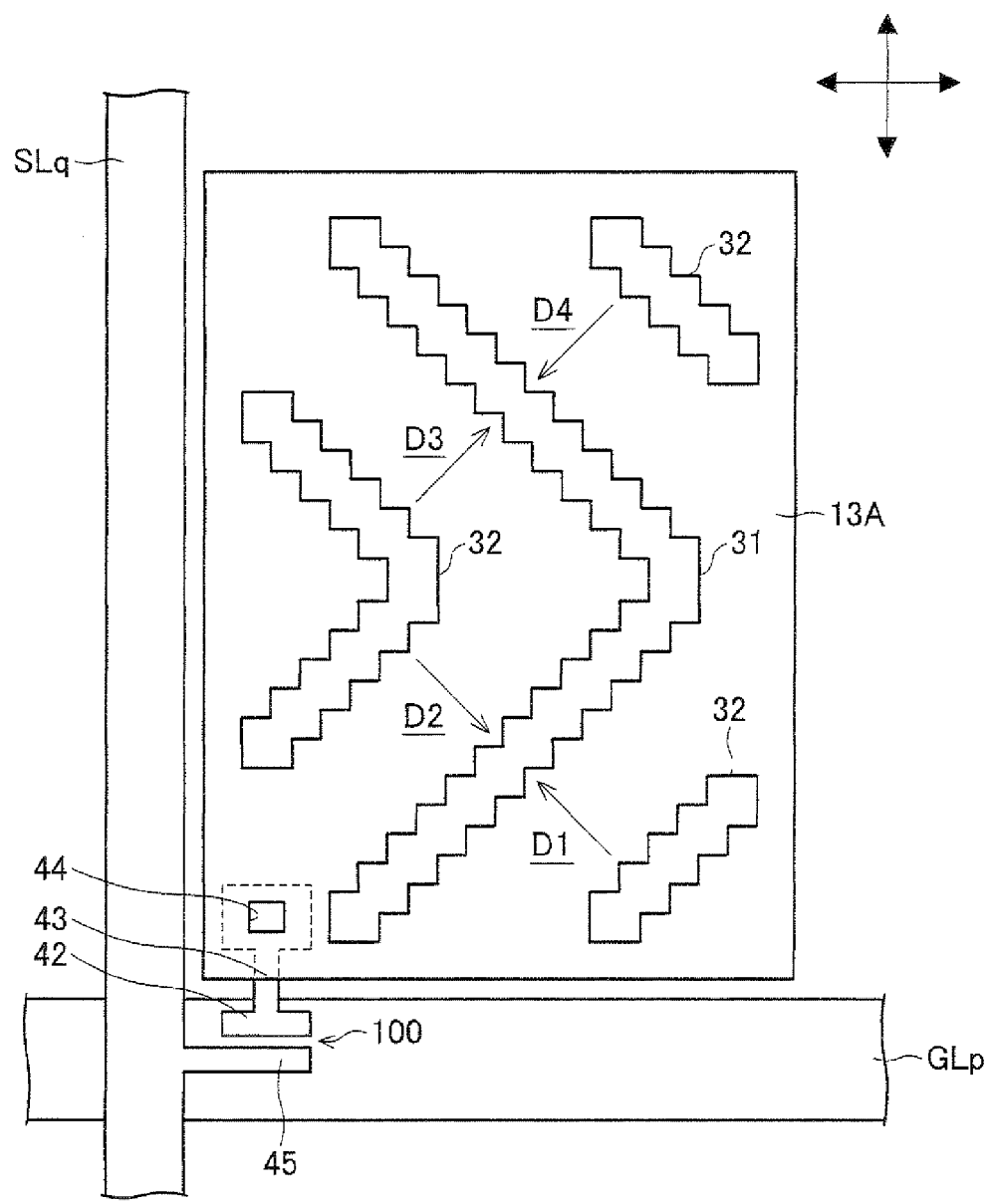

FIG. 8 is a see-through plan view illustrating a positional relationship between the projecting sections and the slits that are provided in a region in which a pixel electrode is provided (pixel region), viewed from the direction perpendicular to the surfaces of the active matrix substrate and of the counter substrate.

FIG. 9

Figure 9:
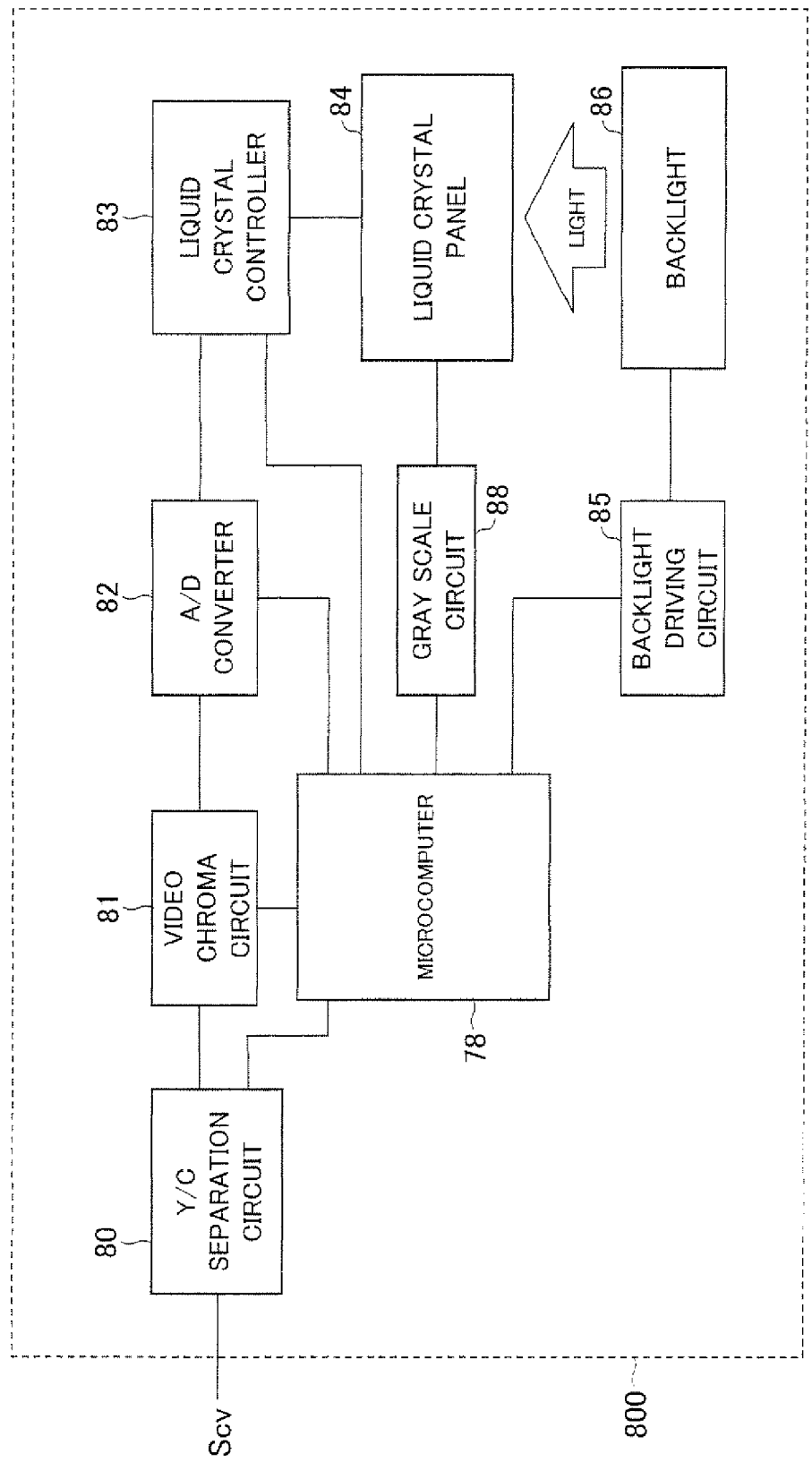

FIG. 9 is a block diagram illustrating an arrangement of a display device of a television receiver.

FIG. 10

Figure 10:
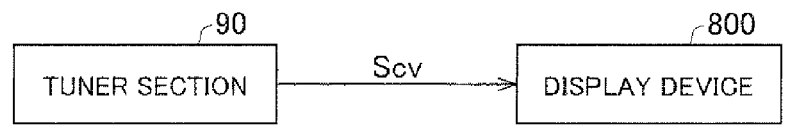

FIG. 10 is a block diagram illustrating a connection between a tuner section and the display device.

FIG. 11

Figure 11:
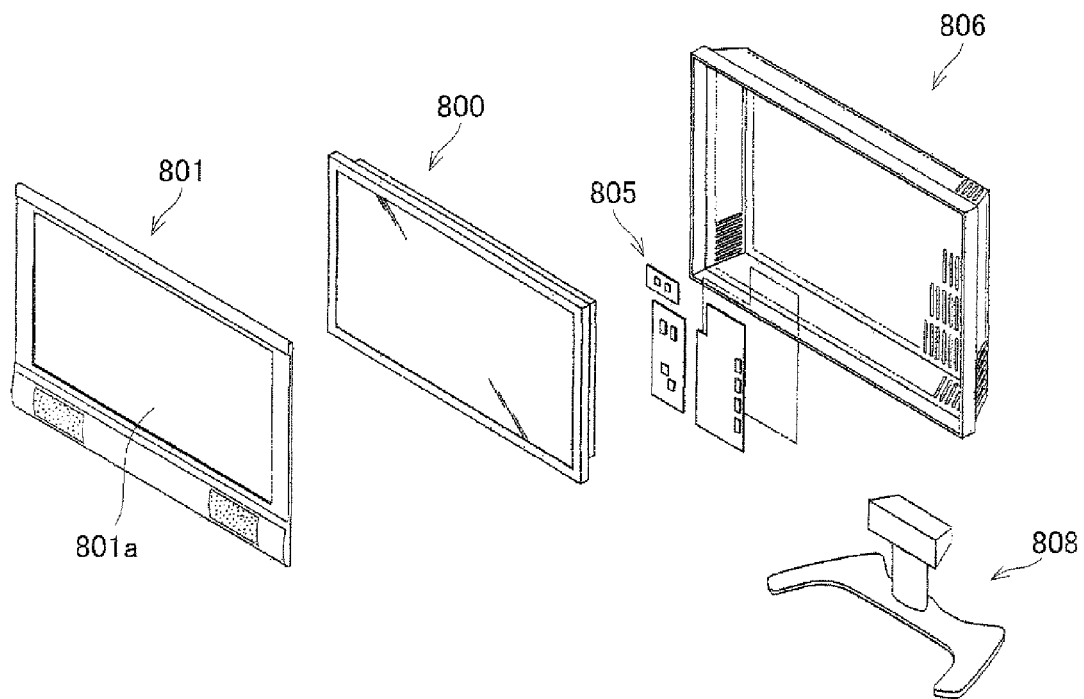

FIG. 11 is an exploded perspective view illustrating an example of a mechanical arrangement of the television receiver including the display device.

FIG. 12

Figure 12:
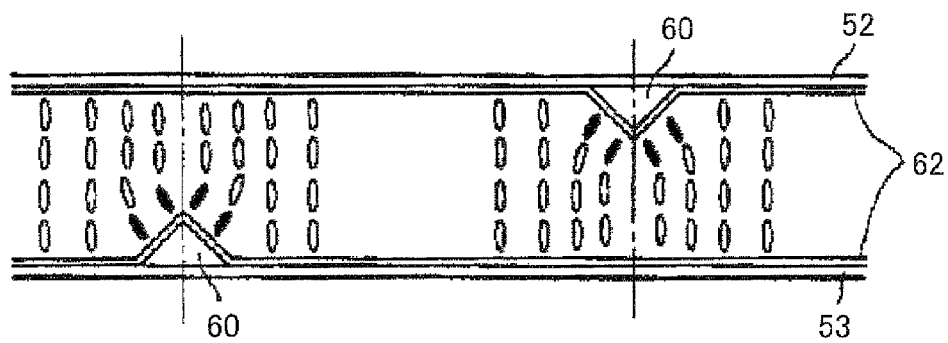
Figure 12:
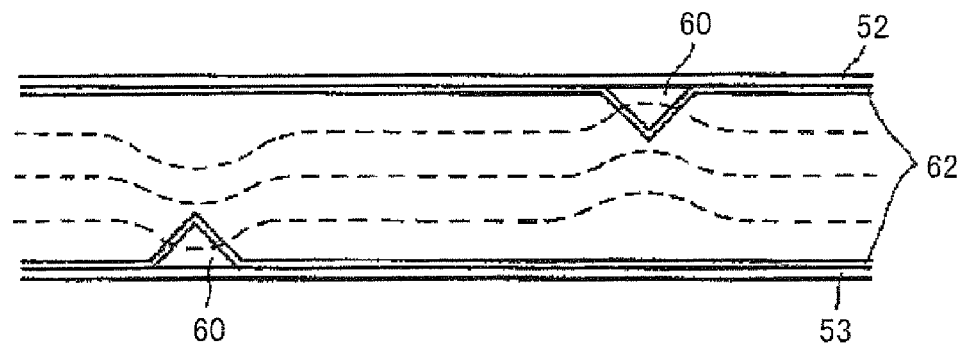
Figure 12:
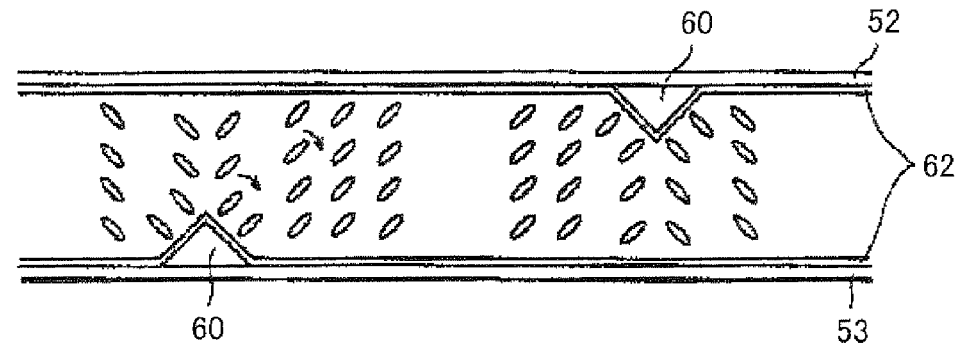

(a) to (c) of FIG. 12 are cross-sectional views illustrating an example of a conventional liquid crystal display device equipped with domain controlling means.

FIG. 13

Figure 13:
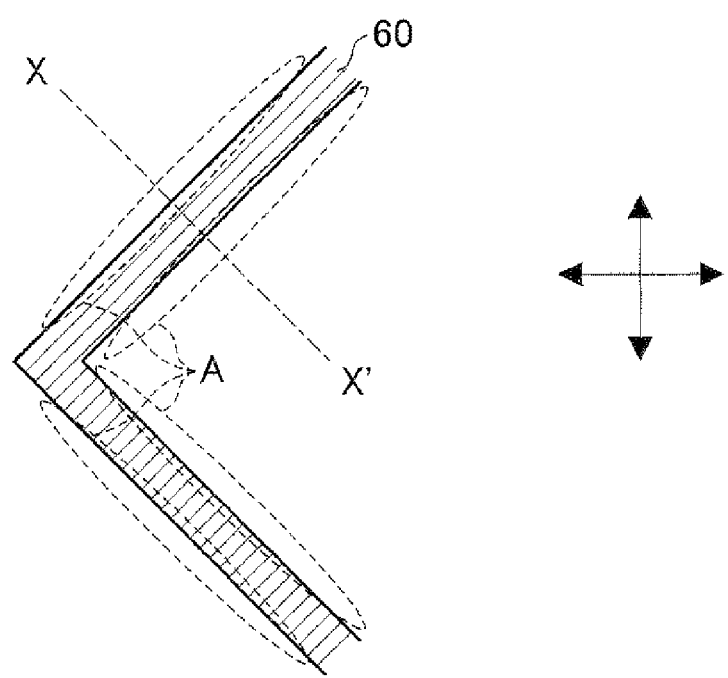

FIG. 13 illustrates, in a conventional arrangement, a relationship between (i) a projection and (ii) a polarization axis of two polarizing plates provided respectively on a light-entering side and on a light-emitting side.

EXPLANATION OF REFERENTIAL NUMERALS

1 Liquid Crystal Display
2 Display Controlling Circuit
3 Source Driver
4 Gate Driver
5 Light Source Driving Circuit
10 Liquid Crystal Panel Section
11A Active Matrix Substrate
11B Counter Substrate
12A First Polarizing Plate
12B Second Polarizing Plate
13A Pixel Electrode
13B Counter Electrode
14A and 14B Alignment Films
20 Liquid Crystal Layer
24 Liquid Crystal Driving Panel
25 Backlight
31 Projecting Section
32 Slit
42 Drain Electrode
43 Drain Drawing Wire
44 Contact Hole
45 Source Electrode
52 Electrode
53 Electrode
60 Projection 62 Vertical Alignment Film
80 Y/C Separation Circuit
81 Video Chroma Circuit
82 A/D Converter
83 Liquid Crystal Controller
84 Liquid Crystal Panel
85 Backlight Driving Circuit
86 Backlight
87 Microcomputer
88 Gray Scale Circuit
90 Tuner Section
100 TFT
300 Source Driver
400 Gate Driver
800 Display Device
801 First Housing
801a Opening
805 Operation Circuit
806 Second Housing
808 Supporting Member

DESCRIPTION OF EMBODIMENTS

One embodiment of the present invention is described below with reference to the attached drawings.

Overall Arrangement of Liquid Crystal Display Device

FIG. 7 is a block diagram illustrating (i) an arrangement of a liquid crystal display device 1 according to the present embodiment and (ii) an equivalent circuit of a liquid crystal panel section 10 of the liquid crystal display device 1. The liquid crystal display device 1 includes: a source driver 3 serving as a data signal line driving circuit; a gate driver 4 serving as a scanning signal line driving circuit; a liquid crystal driving panel 24 in a form of active matrix; a backlight 25 serving as a lighting system in a form of plane; a light source driving circuit 5 for driving the backlight 25; and a display controlling circuit 2 for controlling the source driver 3, the gate driver 4, and the light source driving circuit 5. In the present embodiment, the liquid crystal driving panel 24 is an active matrix type liquid crystal panel; however, the liquid crystal driving panel 24 may also be an integrated liquid crystal driving panel including the source driver 3 and the gate driver 4.

The liquid crystal driving panel 24 in the liquid crystal display device includes: a plurality of gate lines GL1 to GLm serving as a plurality of (an m number of) scanning signal lines; a plurality of source lines SL1 to SLn serving as a plurality of (an n number of) data signal lines intersecting with the gate lines GL1 to GLm; and a plurality of (an m×n number of) pixel forming sections provided at respective intersections of the gate lines GL1 to GLm and the source lines SL1 to SLn. These pixel forming sections are arranged in a matrix manner so as to constitute pixel arrays. Hereinafter, a gate line direction along which the pixel arrays extend is referred to as a row direction, whereas a source line direction along which the pixel arrays extend is referred to as a column direction.

Each of the pixel forming sections includes: a TFT 100, which is a switching element in which a gate terminal is connected to a corresponding gate line GLj passing through a corresponding intersection whereas a source terminal is connected to a corresponding source line SLi passing thorough the corresponding intersection; a pixel electrode connected to a drain terminal of the TFT 100; a common electrode Ec, which is a counter electrode provided for all the plurality of pixel forming sections; and a liquid crystal layer being provided for all the plurality of pixel forming sections and being sandwiched between the pixel electrode and the common electrode Ec. The pixel electrode and the common electrode Ec provide a liquid crystal capacitance, which constitutes a pixel capacitor Cp. Note generally that an auxiliary capacitor (retention capacitor) is provided in parallel with the liquid crystal capacitance so that the pixel capacitor surely retains a voltage; however, the auxiliary capacitor is not directly related to the present embodiment. Therefore, descriptions and illustrations of the auxiliary capacitor are omitted here.

The pixel electrode in each of the pixel forming sections is given, from the source driver 3 and the gate driver 4, potential corresponding to an image to be displayed. The common electrode Ec is given, from a power supply circuit (not illustrated), predetermined potential Vcom. As such, a voltage corresponding to a potential difference between the pixel electrode and the common electrode Ec is applied to the liquid crystal, thereby controlling optical transmittance of the liquid crystal layer. The image is thus displayed. Note however that in order to control the optical transmittance by applying the voltage to the liquid crystal layer, polarizing plates are employed. In the present embodiment, the polarizing plates are arranged so as to achieve normally black display. That is, each of the pixel forming sections gives a black pixel while no voltage is applied to the pixel capacitor Cp.

The backlight 25 is the lighting system in the form of plane, which backlights the liquid crystal panel section 10. The backlight 25 includes, for example, a cold cathode fluorescent tube and a light guide plate. The backlight 25 is driven by the light source driving circuit 5 so as to emit light, with which each of the pixel forming sections of the liquid crystal driving panel 24 is illuminated.

The display control circuit 2 receives, from an external signal source, digital video signals Dv indicative of an image to be displayed; horizontal sync signals HSY and vertical sync signals VSY which correspond to the digital video signals Dv; and controlling signals Dc for controlling display operation. Based on the digital video signals Dv, the horizontal sync signals HSY, the vertical sync signals VSY, and the controlling signals Dc thus received, the display controlling circuit 2 generates and outputs data start pulse signals SSP; data clock signals SCK; latch strobe signals (signals for controlling application of data signals) LS; polarity reversal signals POL; digital image signals DA (signals equivalent to the video signals Dv) indicative of the image to be displayed; gate start pulse signals GSP; gate clock signals GCK; and gate driver output controlling signals (scanning signal output controlling signals) GOE. These signals are signals for displaying on the liquid crystal panel 24 the image based on the digital video signals Dv.

Among the signals generated in the display controlling circuit 2 as described above, the digital image signals DA, the latch strobe signals LS, the data start pulse signals SSP, the data clock signals SCK, and the polarity reversal signals POL are supplied to the source driver 3, whereas the gate start pulse signals GSP, the gate clock signals GCK, and the gate driver output controlling signals GOE are supplied to the gate driver 4.

Every horizontal period, the source driver 3 generates, line by line, data signals S(1) to S(n) as analog voltages corresponding to respective pixel values in each horizontal scanning line of the image of the digital image signals DA. The source driver 3 generates the data signals S(1) to S(n), based on the digital image signals DA, the date start pulse signals SSP, the data clock signals SCK, the latch strobe signals LS, and the polarity reversal signals POL thus supplied. The data signals S(1) to S(n) thus generated are applied to the respective source lines SL1 to SLn.

The gate driver 4 generates scanning signals G(1) to G(m) based on the gate start pulse signals GSP (GSPa, GSPb), the gate clock signals GCK (GCKa, GCKb); and the gate driver output controlling signals GOE (GOEa, GOEb). The scanning signals G(1) to G(m) thus generated are applied to the respective gate lines GL1 to GLm so as to selectively drive the gate lines GL1 to GLm.

The source lines SL1 to SLn and the gate lines GL1 to GLm of the liquid crystal panel 24 are driven by the souse driver 300 and the gate driver 400 respectively. As a result, the voltage of the source line SLi is applied to the corresponding pixel capacitor Cp via the TFT 100 connected to the gate line GLj selected (i is selected from 1 to n, j is selected from 1 to m). In this manner, a voltage according to the corresponding digital video image signal DA is applied to the corresponding pixel forming section, thereby controlling the optical transmittance of the light emitted from the backlight 25. In this way, the image of the external digital video signals Dv is displayed on the liquid crystal drive panel 24.

Cross-Sectional Structure of Liquid Crystal Display Device (a) and (b) of FIG. 2 are cross-sectional views illustrating a schematic structure of a liquid crystal display device 1 according to the present embodiment. As shown in FIG. 2, the liquid crystal display device 1 includes: a liquid crystal panel section 10; a backlight 25 serving as a light source; a first polarizing plate 12A; and a second polarizing plate 12B. The first polarizing plate 12A is provided on a light-entering side of the liquid crystal panel section 10, that is, between the liquid crystal panel section 10 and the backlight 25. On the other hand, the second polarizing plate 12B is provided on a light-emitting side of the liquid crystal panel section 10, that is, the liquid crystal panel section 10 is between the second polarizing plate 12B and the backlight 25. With the arrangement, light emitted by the backlight 25 passes through the first polarizing plate 12A, the liquid crystal panel section 10, and the second polarizing plate 12B in this order. Display is performed with light passing them as such.

The first polarizing plate 12A and the second polarizing plate 12B allow passage of light of a predetermined polarization direction only. The polarization direction of the light that is allowed passage is specified as a polarization axis. FIG. 4 is an exploded perspective view illustrating how the first polarizing plate 12A, the second polarizing plate 12B, and the liquid crystal panel 10 are arranged. As illustrated in FIG. 4, the first polarizing plate 12A and the second polarizing plate 12B are arranged so that the polarization axes of the first polarizing plate 12A and of the second polarizing plate 12B are orthogonal to each other. That is, the first polarizing plate 12A and the second polarizing plate 12B are provided in a crossed Nicols manner.

The liquid crystal panel section 10 includes: an active matrix substrate 11A and a counter substrate 11B, which are optically transmissive. The active matrix substrate 11A and the counter substrate 11B face each other, and a gap between the active matrix substrate 11A and the counter substrate 11B is kept constant by spacers (not illustrated) such as plastic beads and columnar resin structural objects. The active matrix substrate 11A and the counter substrate 11B hold a liquid crystal layer 20 therebetween. According to the present embodiment, the liquid crystal layer 20 is constituted from nematic liquid crystal, which has a negative permittivity anisotropy.

On a surface of the active matrix substrate 11A, a pixel electrode 13A made of an ITO film is provided so as to face the liquid crystal layer 20. Further, on a surface of the pixel electrode 13A, an alignment film 14A for aligning the liquid crystal molecules perpendicular to the surfaces of the substrates is provided so as to face the liquid crystal layer 20.

Similarly, on a surface of the counter substrate 11B, a counter electrode 13B made of the ITO film is provided so as to face the liquid crystal layer 20. Further, on the counter electrode 13B, an alignment film 14B for aligning the liquid crystal molecules perpendicular to the surfaces of the substrates is provided so as to face the liquid crystal layer 20. Furthermore, on the counter electrode 13B, projecting sections 31 serving as alignment control structures for controlling an alignment direction of the liquid crystal molecules are provided. On the counter substrate 11B, other members such as a color filter, and a black matrix (these are not illustrated) are provided.

The liquid crystal display device 1 thus arranged is to have a function as a liquid crystal display device of an MVA mode. That is, the liquid crystal molecules contained in the liquid crystal layer 20 are aligned substantially perpendicular to the surfaces of the substrates while no voltage is applied. In this state, a polarization plane of light entered the liquid crystal panel section 10 is scarcely twisted in the liquid crystal layer. On the other hand, when the voltage is applied, the liquid crystal molecules are oriented at a certain angle with respect to a direction perpendicular to the surfaces of the substrates. The angle at which the liquid crystal molecules are oriented depends on intensity of the voltage applied. In this state, the polarization plane of the light entered the liquid crystal panel section 10 is twisted in the liquid crystal layer. Accordingly, by arranging the two polarizing plates provided respectively on the light-entering side and on the light-emitting side of the liquid crystal display device so that their polarization axes are in a crossed Nicols state, it is possible to achieve normally black display, in which black display is performed while no voltage is applied whereas white display is performed while the voltage is applied.

Further, the projecting section 31 divides each pixel into a plurality of regions in which the voltage application orients the liquid crystal molecules in different directions at voltage application. As such, the liquid crystal display device 1 of the MVA mode, which creates the plurality of regions within each pixel and so that the liquid crystal molecules are oriented in different directions in the plurality of regions, is achieved.

Layout of Pixel Electrodes and Projecting Sections

FIG. 5 is a see-through plan view illustrating a positional relationship between (i) one of the pixel electrodes 13A and a structure therearound in the active matrix substrate 11A and (ii) one of the projecting sections 31 provided on the counter substrate 11B. According to FIG. 5, on the active matrix substrate 11A, gate lines GLp extending in a row direction (a horizontal direction in FIG. 5) and source lines SLq extending in a column direction (a vertical direction in FIG. 5) are provided.

Further, a TFT 100 serving as a switching element, which is an active element, is provided at a corresponding intersection of a gate line GLp and a source line SLq. The TFT 100 includes: a source electrode 45 which is connected to the corresponding source line SLq; a drain electrode 42; a gate electrode constituted from the corresponding gate line GLp; and a semiconductor layer (not illustrated).

The drain electrode 42 is connected to a corresponding drain drawing wire 43 that is made of a conductive layer constituting a wire section. The drain drawing wire 43 is connected to the corresponding pixel electrode 13A through a corresponding contact hole 44 passing through an interlayer insulating film. In FIG. 5, auxiliary capacitor wire is not illustrated.

Further, a projecting section 31 is provided in a region on the counter substrate 11B, which region correspond to a pixel region when viewed from a direction perpendicular to the surfaces of the active matrix substrate 11A and of the counter electrode 11B. The pixel regions are regions in which the pixel electrodes 13A are provided respectively. The projecting section 31 has an outline shape such that a plurality of unit patterns each having a side in parallel with the polarization axis of the first polarizing plate 12A and a side in parallel with the polarization axis of the second polarizing plate 12B are continuously arranged, when viewed from the direction perpendicular to the surfaces of the active matrix substrate 11A and of the counter substrate 11B. In FIG. 5, the vertical direction and the horizontal direction correspond to a direction of the polarization axis of the first polarizing plate 12A or a direction of the polarization axis of the second polarizing plate 12B, respectively.

According to an example shown in FIG. 5, the projecting section 31 is roughly separated into two parts. A first part has a centerline drawn from upper right to lower left (in FIG. 5) at 45 degrees. A second part has the other centerline drawn from upper left to lower right (in FIG. 5) at 45 degrees. A lower-left end of the first part is connected with an upper-left end of the second part. As such, the projecting section 31 has a shape that is bent at the right angle at a connection point of the first part and the second part.

Further, the outline shape of the projecting section 31 is such that a mountain part whose vertex angle is 90 degrees is repeated along the centerline and the other centerline. Since each of the centerline and the other centerline is at 45 degrees with respect to the polarization axis of the first polarizing plate 12A or to the polarization axis of the second polarizing plate 1213, one side of the mountain part is in parallel with the polarization axis of the first polarizing plate 12A and the other side of the mountain part is in parallel with the polarization axis of the second polarizing plate 12B.

Method of Driving Liquid Crystal

A method of driving liquid crystal in the present embodiment is described with reference to (a) and (b) of FIG. 2, and (a) and (b) of FIG. 1. (a) and (b) of FIG. 2 are cross-sectional views illustrating a schematic structure of the liquid crystal display device 1. (a) and (b) of FIG. 1 illustrate an outline shape of one of the projecting sections 31 viewed from a direction perpendicular to the surfaces of the active matrix substrate 11A and of the counter substrate 11B.

First, the liquid crystal layer 20 under no voltage application is described with reference to (a) of FIG. 2 and (a) of FIG. 1. The liquid crystal molecules are aligned perpendicular to the surfaces of the substrates due to effect of the alignment film 14A and the alignment film 14B while no voltage is applied. As such, a birefringence effect due to the liquid crystal molecules does not occur, and therefore light is not transmitted.

On the other hand, since liquid crystal molecules in the vicinity of the projecting sections 31 are also to be aligned perpendicular to slanted surfaces of the projecting sections 31, the liquid crystal molecules in the vicinity of the projecting sections 31 are aligned obliquely to the surfaces of the substrates.

Conventionally, each projecting section had an outline shape such as being in parallel with a centerline of the projecting section, i.e., a straight line at 45 degrees with respect to a polarization axis. Therefore, the liquid crystal molecules were aligned at 45 degrees with respect to the polarization axis while no voltage was applied. In other words, light is conventionally passed in the vicinity of the projecting sections, i.e., a light leakage occurred in the vicinity of the projecting sections even while no voltage was applied. The light leakage was associated with a decrease in contrast.

In contrast, according to the present embodiment, the projecting section 31 has an outline shape that is in parallel with the polarization axis of the first polarizing plate 12A or with the polarization axis of the second polarizing plate 12B. In other words, as illustrated in (a) of FIG. 1, the liquid crystal molecules in the vicinity of the projecting sections 31 are also aligned in parallel with the polarization axis of the first polarizing plate 12A or with the polarization axis of the second polarizing plate 12B.

Here, the liquid crystal molecules in the vicinity of the projecting sections 31 are obliquely aligned; however, in a direction that is parallel with the polarization axis. That is, the light passes through the liquid crystal layer 20 without rotation of a polarizing direction thereof. As such, it is possible to prevent the light leakage that is associated with the decrease in the contrast.

Next, the liquid crystal layer 20 under voltage application is described with reference to (b) of FIG. 2 and (b) of FIG. 1. The liquid crystal molecules are oriented depending on intensity of electrical field while the voltage is applied. Here, the electrical field is perpendicular to the substrates. Therefore, unless an alignment direction is set by rubbing, the liquid crystal molecules can be oriented at any directions within 360 degrees with respect to the electrical field.

The liquid crystal molecules have such a characteristic that if some of the liquid crystal molecules are obliquely aligned in advance due to effect of the projecting sections 31, then the liquid crystal molecules in the vicinity of those obliquely aligned in advance are also aligned obliquely in the same direction. According to (a) of FIG. 1, a region in which the liquid crystal molecules in the vicinity of the corresponding projecting section 31 are oriented in parallel with the polarization axis of the first polarizing plate 12A and a region in which the liquid crystal molecules in the vicinity of the corresponding projecting section 31 are oriented in parallel with the polarization axis of the second polarizing plate 12B are repeatedly and alternately arranged. Therefore, averaged effects of these regions cause the liquid crystal molecules other than those in the vicinity of the projecting sections 31 to be oriented at 45 degrees with respect to the polarization axis while the voltage is applied (see (b) of FIG. 1).

In addition, the electrical field to be generated in the liquid crystal layer 20 is also obliquely distributed due to the effect of the projecting sections 31. The electrical field is generated also in such a manner that a region in which the electrical field is in parallel with the polarization axis of the first polarizing plate 12A and a region in which the electrical field is in parallel with the polarization axis of the second polarizing plate 12B are repeatedly and alternately arranged. Therefore, averaged effects of the electrical field in these regions also cause the liquid crystal molecules other than those in the vicinity of the projecting sections 31 to be oriented at 45 degrees with respect to the polarization axis while the voltage is applied (see (b) of FIG. 1).

As described above, with the projecting sections 31, it is possible to achieve a state where the liquid crystal molecules are stably oriented in an intended direction in each alignment region defined by the corresponding projecting section 31, due to the alignment effect of the slanted surfaces of the projecting sections 31 and to the effect of the obliquely distributed electrical field in the vicinity of the projecting sections 31. If a higher voltage is applied, the liquid crystal molecules are oriented in substantially parallel with the substrates.

Arrangement with Slits

Next, a case where the slits 32 are provided instead of the projecting sections 31 is described. (a) and (b) of FIG. 3 are cross-sectional views illustrating a schematic structure of the liquid crystal display device 1 in which the slits 32 are provided. As illustrated in FIG. 3, the slits 32 are provided on the counter substrate 11B. Each of the slits 32 is constituted from a region in which no counter electrode 13B is provided, i.e., an open region of the counter electrode 13B. Note however that the alignment film 14B is provided even in the regions in which the slits 32 are provided. Since structures other than the slits 32 are the same as those shown in (a) and (b) of FIG. 2, descriptions thereof are omitted here.

The slits 32 may have an outline shape being same as that of the aforementioned projecting sections 31 when viewed from the direction perpendicular to the surfaces of the active matrix substrates 11A and of the counter electrode 11B. With the arrangement, each of the slits 32 divides each pixel into a plurality of regions, in which the voltage application orients the liquid crystal molecules in different directions at voltage application. This makes it possible to achieve a liquid crystal display device of an MVA mode wherein each of the pixels includes a plurality of regions in each of which the liquid crystal molecules are oriented in different directions.

In the case where the slits 32 are provided, the liquid crystal is driven through a driving method, as described below. First, the liquid crystal layer 20 under no voltage application is described with reference to (a) of FIG. 3 and (a) of FIG. 1. While no voltage is applied, the liquid crystal molecules are aligned perpendicular to the surfaces of the substrates due to effects of the alignment film 14A and the alignment film 14C. As a result, the birefringence effect due to the liquid crystal molecules does not occur, and therefore the light is not transmitted.

On the other hand, the liquid crystal molecules in the vicinity of the slits 32 are aligned obliquely to the surfaces of the substrates due to effect of slanted surfaces of the slits 32. Further, by applying a low voltage during a black display period so as to increase response speed of the liquid crystal molecules, it is possible to cause the liquid crystal molecules in the vicinity of the slits to be slightly oriented obliquely in advance. This also causes the liquid crystal molecules in the vicinity of the slits 32 to be oriented obliquely to the surfaces of the substrates. Note that the low voltage may be applied during the black display period so as to increase the response speed of the liquid crystal molecules also in the case where the projecting sections 31 are provided.

Conventionally, each slit had an outline shape that is in parallel with a centerline of the slit, i.e., a straight line at 45 degrees with respect to the polarization axis. Therefore, the liquid crystal molecules were aligned at 45 degrees with respect to the polarization axis while no voltage was applied. In other words, the light was passed in the vicinity of the slits, i.e., the light leakage occurred in the vicinity of the slits even while no voltage was applied. The light leakage results in the decrease in the contrast.

In contrast, according to the present embodiment, each of the slits 32 has an outline shape that is in parallel with the polarization axis of the first polarizing plate 12A or with the polarization axis of the second polarizing plate 12B. In other words, as illustrated in (a) of FIG. 1, the liquid crystal molecules in the vicinity of the slits 32 are also aligned in parallel with the polarization axis of the first polarizing plate 12A or with the polarization axis of the second, polarizing plate 12B.

Here, the liquid crystal molecules in the vicinity of the slits 32 are obliquely aligned; however, in a direction that is in parallel with the polarization axis. That is, the light passes through the liquid crystal layer 20 without rotation of a polarizing direction thereof. This makes it possible to prevent the light leakage that leads to the decrease in the contrast.

Next, the liquid crystal layer 20 while a voltage is applied is described with reference to (b) of FIG. 3 and (b) of FIG. 1. Under the voltage application, the liquid crystal molecules are oriented depending on the intensity of the electrical field. In the case of (a) of FIG. 1, a region in which the liquid crystal molecules in the vicinity of the slits 32 are oriented in parallel with the polarization axis of the first polarizing plate 12A and a region in which the liquid crystal molecules in the vicinity of the slits 32 are oriented in parallel with the polarization axis of the second polarizing plate 12B are repeatedly and alternately arranged. Therefore, averaged effects of these regions cause the liquid crystal molecules other than those in the vicinity of the slits 32 to be oriented at 45 degrees with respect to the polarization axis while the voltage is applied (see (b) of FIG. 1).

In addition, the electrical field to be generated in the liquid crystal layer 20 is also obliquely distributed due to the effect of the slits 32. The electrical field is also generated in such a manner that a region in which the electrical field is in parallel with the polarization axis of the first polarizing plate 12A and a region in which the electrical field is in parallel with the polarization axis of the second polarizing plate 12B are repeatedly and alternately provided. Therefore, averaged effects of the electrical field in these regions also cause the liquid crystal molecules other than those in the vicinity of the slits 32 to be oriented at 45 degrees with respect to the polarization axis while the voltage is applied (see (b) of FIG. 1).

As described above, the slits 32 make it possible to achieve a state where the liquid crystal molecules are stably oriented in an intended direction in each alignment region defined by the corresponding slit 32, due to the alignment effect of the slanted surfaces of the slits 32 and of the effect of the oblique electrical field in the vicinity of the slits 32. If a higher voltage is applied, the liquid crystal molecules are oriented in substantially parallel with the substrate.

Variations of Regions in which Projecting Sections or Slits are Provided

According to examples illustrated in (a) and (b) of FIG. 2, the projecting sections 31 are provided on the counter substrate 11B; however, regions in which the projecting sections 31 are provided are not limited to these examples, and the projecting sections 31 may be provided on the active matrix substrate 11A. The projecting sections 31 may also be provided on both the counter substrate 11B and the active matrix substrate 11A.

Similarly, according to examples illustrated in (a) and (b) of FIG. 3, the slits 32 are provided on the counter substrate 11B by making open regions on the counter substrate 13B;

however, regions in which the slits 32 are provided are not limited to these examples, and the slits 32 may be provided on the active matrix substrate 11A by making the open regions on the pixel electrodes 13A. The slits 32 may also be provided on both the counter substrate 11B and the active matrix substrate 11A.

Further, both of the projecting sections 31 and the slits 32 may be provided on at least one of the counter substrate 11B and the active matrix substrate 11A. An example of such an arrangement is shown in FIG. 8. As illustrated in FIG. 8, the projecting sections 31 and the slits 32 are provided in a region (pixel region) in which the corresponding pixel electrode 13A is provided, when viewed from the direction perpendicular to the surfaces of the active matrix substrate 11A and of the counter substrate 11B. The projecting sections 31 are provided on the counter substrate 11B, whereas the slits 32 are provided as opening sections of the corresponding pixel electrode 13 provided on the active matrix substrate 11A.

In each region defined by the projecting sections 31 and the slits 32, directions in which the liquid crystal molecules are oriented are different by 90 degrees while gray level display is performed. In FIG. 8, the arrows indicate the respective directions in which the liquid crystal molecules in each alignment region (for example, D1, D2, D3, and D4) are oriented, on a conceptual basis. Assuming that (i) the domain D1 and the domain D2, in each of which the liquid crystal molecules are oriented in directions opposite to each other, are in group 1 and (ii) the domain D3 and D4, in each of which the liquid crystal molecules are oriented in directions opposite to each other, are in group 2, the liquid crystal molecules in the group 1 and the liquid crystal molecules in the group 2 are oriented in directions orthogonal to each other.

The domain D1 and the domain D2, in each of which the liquid crystal molecules are oriented in directions opposite to each other, and the domain D3 and the domain D4, in each of which the liquid crystal molecules are oriented in directions opposite to each other, are defined by the corresponding projecting section 31 provided on the counter substrate 11B or by the corresponding slit 32 provided on the active matrix substrate 11A. As such, the projecting sections 31 and the slits 32 serve as borders (a) between the domain D1 and the domain D2 and (a) between the domain D3 and the domain D4. With the domains D1, D2, D3, and D4 which are different from each other, it is possible to achieve an MVA type liquid crystal display device that excels in a viewing angle characteristic.

Variations of Outline Shape of Projecting Sections and Slits

Next, variations of the outline shape of the projecting sections 31 and the outline shape of the slits 32 are described with reference to (a) to (e) of FIG. 6. (a) of FIG. 6 is an example of the outline shape of the projecting sections 31 or of the slits 32, in which example a plurality of unit patterns having a vertex angle of 90 degrees are arranged symmetrically on both sides of a centerline of the projecting sections 31 or of the slits 32.

(b) of FIG. 6 is an example of the outline shape of the projecting sections 31 or of the slits 32, in which example a plurality of mountain parts each having the vertex angle of 90 degrees are arranged alternately and symmetrically on both sides of the centerline of the projecting sections 31 or of the slits 32. That is, the outline shape is such that a mountain portion of the mountain part is opposed to a valley portion of the mountain part in an area, whereas the valley portion of the mountain shape is opposed to the mountain portion of the mountain part in another area. In other words, the outline shape of the projecting sections 31 or of the slits 32 is such that (i) a plurality of sides that are in parallel with the polarization axis of the first polarizing plate and (ii) a plurality of sides that are in parallel with the polarization axis of the second polarizing plate are repeatedly and alternately arranged in a zig-zag manner with a predetermined width therebetween.

(c) of FIG. 6 illustrates an example of the projecting sections 31 or the slits 32 constituted in such a manner that a plurality of squares having sides in parallel with the polarization axis of the first polarizing plate 12A and sides in parallel with the polarization axis of the second polarizing plate 12B are repeatedly arranged at an angle of 45 degrees with respect to the polarization axes. It is also possible to call this example a varied form of the example shown in (a) of FIG. 6, i.e., the varied form of the example in which a plurality of mountain parts each having a vertex angle of 90 degrees are arranged symmetrically on both sides of the centerline. According to (c) of FIG. 6, adjacent ones of the plurality of squares are in contact with each other at vertexes thereof; however, the adjacent ones of the plurality of squares may be arranged at a small interval.

An example shown in (d) of FIG. 6 is such that the vertexes of the mountain portions and the vertexes of the valley portions of the mountain parts shown in (a) of FIG. 6 are chipped off along straight lines in parallel with the centerline. Such an example in which only one of the vertexes of the mountain portions and the vertexes of the valley portions are chipped off is also regarded as the example of (d) of FIG. 6.

An example shown in (e) of FIG. 6 is such that the vertexes of the mountain portions and the vertexes of the valley portions of the mountain parts shown in (a) of FIG. 6 are rounded off. Such an example in which only one of the vertexes of the mountain portions and the vertexes of the valley portions are rounded off is also regarded as the example of (e) of FIG. 6.

In the examples shown in (d) and (e) of FIG. 6, the liquid crystal molecules in the vicinity of the mountain portions of the mountain parts and the valley portions of the mountain parts are aligned in directions parallel neither with the polarization axis of the first polarizing plate 12A nor with the polarization axis of the second polarizing plate 12B. This leads to a small light leakage during the black display period. However, the small light leakage does not so much affect display quality since it occurs only in a small region.

The outline shape of the projecting sections 31 or of the slits 32 preferably has more lines at an angle other than 45 degrees with respect to the polarization axis of the first polarizing plate 12A or of the second polarizing plate 12B than lines at 45 degrees with respect to the polarization axis of the first polarizing plate 12A or of the second polarizing plate 12B. The outline shape of the projecting sections 31 or of the slits 32 further preferably has more lines in parallel with or perpendicular to the polarization axis of the first polarizing plate 12A or of the second polarizing plate 12B than lines at 45 degrees with respect to the polarization axis of the first polarizing plate 12A or of the second polarizing plate 12B. This is for preventing the light leakage more advantageously.

The projections and the slits preferably have an average width (in a direction perpendicular to the centerline) of 5 μm to 15 μm. If the average width is smaller than 5 μm, then an alignment controlling ability significantly decreases and also a response speed decreases. If the average width is larger than 15 μm, then a transmittance decreases for only a small improvement in the response speed.

Outline patterns preferably have a thickness of 2 μm to 15 μm. An upper limit of the thickness is determined based on an upper limit of the width of the projections and of the slits. The reason thereof is as follows. A region in which the light leakage occurs (parts A shown in FIG. 13) is approximately 2 µm wide. Therefore if the thickness of the outline patterns is less than 2 µm, then the region in which the light leakage occurs (parts A shown in FIG. 13) cannot be sufficiently covered, thereby limiting an effect of increasing the contrast.

Voltage Application During Black Display Period

As described in the foregoing descriptions, the liquid crystal display device according to the present invention may be arranged such that a predetermined low voltage is applied to pixels even during the black display period. If a high voltage is applied suddenly after no voltage is applied, then the liquid crystal molecules away from the projections or the slits may be oriented in unstable directions for a while, thereby causing a decrease in the response speed. Assuming that the voltage applied is close to a threshold voltage, the voltage being applied during the black display period is preferably higher than 0.2 V and lower than a threshold voltage of the liquid crystal (a voltage at which the transmittance dramatically increases), for example, 1.5 V. As such, the liquid crystal molecules are slightly oriented even during the black display period. Accordingly, the response speed at a time when gray scale changes from white to black is improved. Even if the voltage applied is close to or lower than the threshold voltage, the transmittance gradually increases as the voltage applied increases. Thus, if the voltage is applied even during the black display period, then it is possible to prevent the decrease in contrast due to the light leakage especially in the vicinity of alignment control structures such as the projections and the slits, in comparison with the case where no voltage is applied.

Configuration of Television Receiver

Next, an example of the liquid crystal display device according to the present invention being employed in a television receiver is described as follows. FIG. 9 is a block diagram illustrating a configuration of a display device 800 for the television receiver. The display device 800 includes: a Y/C separation circuit 80; a video chroma circuit 81; an A/D converter 82; a liquid crystal controller 83; a liquid crystal panel 84; a backlight driving circuit 85; a backlight 86; a microcomputer 87; and a gray scale circuit 88. The liquid crystal panel 84 is equivalent to the liquid crystal display device according to the present invention, and includes: a display section constituted from active matrix type pixel arrays; and a source driver and a gate driver which are for driving the display section.

According to the display device 800 configured as described above, first, the Y/C separation circuit 80 receives composite video signals Scv (television signals) from outside, so as to separate the composite video signals Scv into luminance signals and color signals. The luminance signals and the color signals are converted, by the video chroma circuit 81, into analog RGB signals corresponding to respective three primary colors of light. The analog RGB signals thus converted are further converted, by the A/D converter 82, into digital RGB signals, so as to be inputted into the liquid crystal controller 83. The Y/C separation circuit 80 also extracts horizontal sync signals and vertical sync signals from the composite video signals Scv inputted from outside, so that the horizontal sync signals and the vertical sync signals thus extracted are inputted into the liquid crystal controller 83 via the microcomputer 87.

The liquid crystal controller 83 outputs, based on the digital RGB signals (equivalent to the aforementioned digital video signals Dv) inputted from the A/D converter 82, data signals for the drivers. Further, the liquid crystal controller 83 generates, based on the horizontal sync signals and the vertical sync signals, timing controlling signals for operating the source driver and the gate driver which are included in the liquid crystal panel 84 in a same manner as in the foregoing embodiments. The timing controlling signals thus generated are transmitted to the source driver and the gate driver. The gray scale circuit 88 generates gray scale voltages for the respective three primary colors for color display, i.e., R, G, and B, so that the gray scale voltages thus generated are also supplied to the liquid crystal panel 84.

Inside the liquid crystal panel 84, the source driver and the gate driver etc. generate drive signals (such as data signals and scanning signals) based on: the data signals for the drivers; the timing controlling signals; and the gray scale voltages. Based on the drive signals thus generated, color images are displayed on the display section inside the liquid crystal panel 84. In order for the liquid crystal panel 84 to display images, it is necessary to backlight the liquid crystal panel 84. According to the display device 800, the backlight driving circuit 85 that is controlled by the microcomputer 87 drives the backlight 86, thereby irradiating a back surface of the liquid crystal panel 84 with light.

The microcomputer 87 performs control of an entire system, as well as the aforementioned operation. Video signals (the composite video signals) inputted from outside, based on which the display device 800 displays images, are not limited to the video signals based on television broadcasting, and may be various video signals such as those taken by a camera and those supplied via the Internet.

In a case where the display device 800 configured as described above displays the images based on the television broadcasting, the display device 800 is connected with a tuner section 90 (see FIG. 10). The tuner section 90 extracts, from a wave (a high-frequency signal) received by an antenna (not illustrated), signals of an intended channel. The tuner section 90 then converts the signals thus extracted into intermediate frequency signals, and detects the intermediate frequency signals so as to extract the composite video signals Scv serving as television signals. As already described, the composite video signals Scv are then inputted into the display device 800, which displays images based on the composite video signals Scv thus inputted.

FIG. 11 is an exploded perspective view illustrating an example of a mechanical arrangement of a case where the display device arranged as described above is used in a television receiver. According to the example shown in FIG. 11, the television receiver includes, as constituent elements thereof, a first housing 801 and a second housing 806 besides the display device 800. The display device 800 is held by (enclosed by) the first housing 801 and the second housing 806. On the first housing 801, an opening 801a through which the images to be displayed on the display device 800 is provided. The second housing 806 covers a back surface of the display device 800, and is provided with an operating circuit 805 for operating the display device 800. The second housing 806 further includes a supporting member 808 on a lower side thereof.

The invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

The liquid crystal display device according to the present invention is applicable to a variety of display devices, such as monitors of personal computers and television receivers.

The invention claimed is:

1. A liquid crystal panel performing display in a vertical alignment mode, the liquid crystal panel comprising:
   an active matrix substrate on which pixel electrodes, scanning signal lines, and data signal lines are provided;
   a counter substrate that faces the active matrix substrate;
   a liquid crystal layer provided between the active matrix substrate and the counter substrate;
   a first polarizing plate; and
   a second polarizing plate,
   the first polarizing plate having a polarization axis perpendicular to a polarization axis of the second polarizing plate,
   the liquid crystal panel further comprising:
   alignment control structures on at least one of the active matrix substrate and the counter substrate, the alignment control structures controlling alignment directions of liquid crystal molecules,
   the alignment control structures respectively having an outline shape in a region in which one or more of the pixel electrodes are located when viewed from a direction perpendicular to a surface of the active matrix substrate or of the counter substrate, the outline shape being constituted by continuously arranging a plurality of unit patterns each having a side in parallel with the polarization axis of the first polarizing plate and a side in parallel with the polarization axis of the second polarizing plate.

2. The liquid crystal panel according to claim 1, wherein each of the alignment control structures is shaped so that a centerline thereof is a line at a predetermined angle with respect to the polarization axis of the first polarizing plate or with respect to the polarization axis of the second polarizing plate, and the plurality of unit patterns are continuously provided on both sides of the centerline.

3. The liquid crystal panel according to claim 2, wherein the centerline of each of the alignment control structures is at an angle of 45 degrees with respect to the polarization axis of the first polarizing plate or with respect to the polarization axis of the second polarizing plate.

4. The liquid crystal panel according to claim 1, wherein each of the plurality of unit patterns has a shape such that a length of the side in parallel with the polarization axis of the first polarizing plate is equal to a length of the side in parallel with the polarization axis of the second polarizing plate.

5. The liquid crystal panel according to claim 1, wherein each of the plurality of unit patterns is in a shape of a mountain whose vertex angle is 90 degrees.

6. The liquid crystal display panel according to claim 1, wherein each of the plurality of unit patterns is in a shape of a mountain whose vertex angle is 90 degrees, and a mountain shape obtained by continuously arranging the plurality of unit patterns has a chipped vertex angle(s) or a rounded vertex angle(s) in at least one of mountain portion(s) and a valley portion(s) of the plurality of unit patterns.

7. The liquid crystal panel according to claim 1, wherein the alignment control structures are projecting sections projecting inwardly to the liquid crystal layer from at least one of the active matrix substrate and the counter substrate.

8. The liquid crystal panel according to claim 1, wherein the alignment control structures are at least one of (i) slits made of open regions of the pixel electrodes provided on the active matrix substrate and (ii) slits made of open regions of a counter electrode provided on the counter substrate.

9. A liquid crystal display device comprising:
   a liquid crystal panel as set forth in claim 1; and
   a liquid crystal panel driving section for controlling a voltage applied to each pixel of the liquid crystal panel.

10. The liquid crystal display device according to claim 9, wherein the liquid crystal panel driving section applies a predetermined voltage to each pixel even during a black display period.

11. A television receiver comprising:
    a liquid crystal display device as set forth in claim 9 and;
    a tuner section for receiving television broadcasting.

* * * * *